United States Patent [19]

Enomoto et al.

[11] Patent Number: 4,926,101
[45] Date of Patent: May 15, 1990

[54] DC MOTOR STOP DETECTOR AND DC MOTOR BRAKE APPARATUS

[75] Inventors: Akihiko Enomoto, Tokyo; Takashi Koga, Yokohama; Minoru Yoneda; Hiroshi Kobata, both of Yokohama, all of Japan

[73] Assignee: Kabushiki Kaisha Toshiba, Kawasaki, Japan

[21] Appl. No.: 382,412

[22] Filed: Jul. 20, 1989

[30] Foreign Application Priority Data

Jul. 25, 1988 [JP] Japan ............................. 63-183471
Mar. 31, 1989 [JP] Japan ............................... 1-83539

[51] Int. Cl.$^5$ ............................................. H02P 3/10
[52] U.S. Cl. ................................. 318/374; 318/282; 318/293
[58] Field of Search ............... 318/280, 281, 282, 293, 318/373, 374, 375

[56] References Cited

U.S. PATENT DOCUMENTS

| | | | |
|---|---|---|---|
| 3,518,517 | 6/1970 | Rainer | 318/281 X |
| 4,438,378 | 3/1984 | Tanaka | 318/280 |
| 4,460,857 | 7/1984 | Michaelis | 318/375 |
| 4,477,751 | 10/1984 | Kanayama | 318/280 |
| 4,549,120 | 10/1985 | Banno et al. | 318/373 X |
| 4,629,949 | 12/1986 | Senso | 318/293 X |
| 4,833,378 | 5/1989 | Furue et al. | 318/374 |

Primary Examiner—Bentsu Ro
Attorney, Agent, or Firm—Cushman, Darby & Cushman

[57] ABSTRACT

A DC motor is supplied, from a motor driver, with a brake voltage constituted by a forward drive voltage, a reverse drive voltage, and a stop voltage of a zero potential level. An operational current of the motor driver is supplied to a low-pass filter whose output is supplied to first and second sample and hold (S/H) circuits. The first S/H circuit performs its sampling operation after a minute period of time in which the brake voltage goes through a polarity inversion from the reverse drive voltage to the forward drive voltage. The second S/H circuit performs its sampling operation after a minute period of time in which the voltage applied is changed from the forward drive voltage to the reverse drive voltage. The outputs or sampled values of both S/H circuits are compared with each other by a comparator. When the sampled values equal each other, i.e., when the number of rotations of the motor becomes zero, the comparator outputs a coincidence pulse. This pulse is supplied to a stop detector. When detecting this coincidence pulse a predetermined number of times in a row, the stop detector determines that the number of rotations of the motor has become zero.

17 Claims, 8 Drawing Sheets

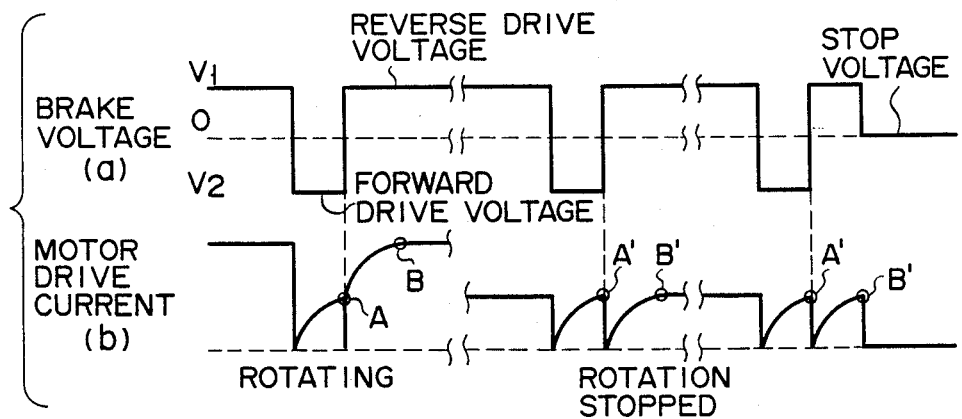
F I G. 3
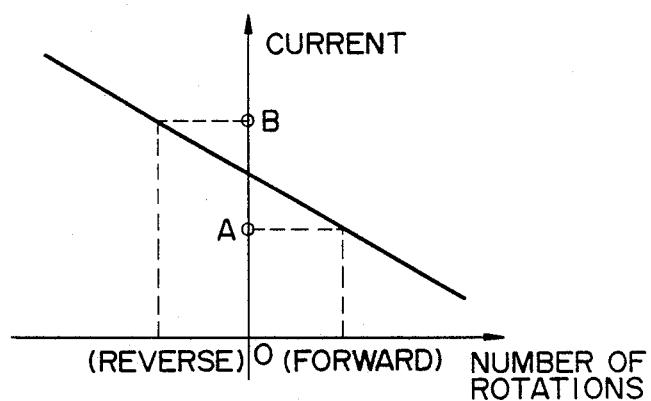
F I G. 4
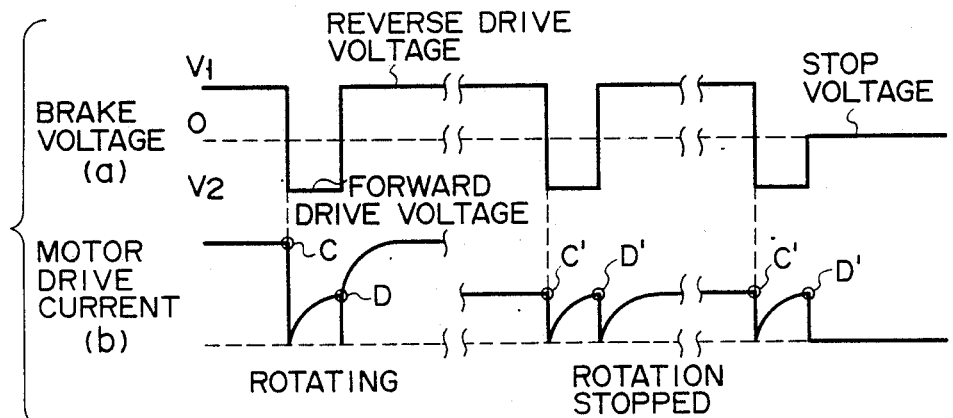
F I G. 5

DC MOTOR STOP DETECTOR AND DC MOTOR BRAKE APPARATUS

BACKGROUND OF THE INVENTION

1. Field of the Invention

The present invention relates to a DC motor stop detector that detects the stopping of a DC motor for use in a CD (compact disk) player, LD (laser disk) player or the like, for example, to drive a disk. This invention also relates to a DC motor brake apparatus that employs the above DC motor stop detector for effectively stopping such a DC motor.

2. Description of the Related Art

With the use of a CD player or LD player, in unloading a disk when playing a music is completed, this process should begin after the disk completely stops rotating.

Stopping the rotation of the disk requires that a brake voltage be supplied to a DC motor which is driving the disk and that the brake voltage be set off when the motor stops rotating. The timing for setting the brake voltage off should be exact, and if it deviates, the forward rotation of the motor may be kept due to the inertia of the motor or the motor may run in the reverse direction. This is likely to damage the disk.

According to a conventional brake apparatus for a DC motor for use in a CD player to drive a compact disk, a motor-rotations detecting disc having a plurality of transparent hole sections and light-shielding sections alternately arranged in the rotational direction is mounted to the rotary shaft of the DC motor. A photosensor is disposed in such a way that part of the periphery of the disc screens the light path of the photosensor. Since the light-shielding sections screen the light path as the disc rotates, the photosensor produces a pulse signal. A rotation detector comprising a counter, etc. counts the number of pulses of the signal per a given time to detect the number of rotations of the motor. There is also a system known which attains such a pulse signal by a combination of a disc having magnetic materials and non-magnetic materials alternately arranged thereon and a magnetic head.

In applying brake, a brake voltage with the opposite polarity to that of a drive voltage is applied to the motor to forcibly weaken the rotational force. When the rotation detector monitoring the rotation of the motor detects that the number of motor's rotations becomes equal to or less than a given value, applying the brake voltage to the motor is stopped. The motor will eventually stop rotating due to its own frictional force.

However, the above conventional DC motor brake apparatus requires a device to detect the rotation of a DC motor, thus increasing the quantity of components. This naturally increases the cost. Since the resolution for detecting the motor's rotations is constant irrespective of the speed of the motor, it would take more time as the motor speed gets slower. This is likely to deviate the time at which generation of the brake voltage should be stopped, thus causing the DC motor to run in the reverse direction.

In short, since the conventional DC motor brake apparatus determines the timing for stopping braking based on the number of rotations of the motor detected, some means or device for detecting the motor's rotations is necessary. In addition, as braking is applied the motor to slow down its speed, it would take more time to detect the number of motor's rotations, which may deviate the timing for stop the braking and cause the motor to run in the reverse direction.

SUMMARY OF THE INVENTION

Accordingly, it is an object of this invention to provide a DC motor stop detector which can be realized with a simple arrangement at a lower cost and can detect the zero-rotational state of a DC motor with high accuracy.

It is another object of this invention to provide a DC motor brake apparatus which, with the use of such a DC motor stop detector, can eliminate the need for a specific device to detect the number of motor's rotations, thus helping make the apparatus itself compact, and which can generate the optimal brake voltage with the correct polarity to surely stop the DC motor.

According to one aspect of this invention, there is provided a DC motor stop detector for detecting the stopping of a DC motor, comprising a motor driver for selectively supplying a forward drive voltage and a reverse drive voltage to a DC motor, control means for supplying a control voltage to the motor driver to control output durations of the forward drive voltage and the reverse drive voltage of the motor driver, current detecting means for detecting a current from the motor driver proportional to a current flowing through the DC motor, and current value comparing means for comparing a first current value of a current attained from the current detecting means at a first timing after a predetermined time from a timing at which the forward drive voltage is output, with a second current value of the current from the current detecting means at a second timing after the predetermined time from a timing at which the reverse drive voltage is output, the DC motor not running when the first current value equals the second current value.

According to another aspect of this invention, there is provided a DC motor brake apparatus for stopping a DC motor running in a forward direction, comprising a motor driver for selectively supplying a forward drive voltage and a reverse drive voltage to a DC motor, control voltage generating means for supplying a control voltage to the motor driver to control output durations and voltage levels of the forward drive voltage and the reverse drive voltage of the motor driver, current detecting means for detecting a current from the motor driver proportional to a current flowing through the DC motor, current value comparing means for comparing a first current value of a current attained from the current detecting means at a first timing after a predetermined time from a timing at which the forward drive voltage is output, with a second current value of the current from the current detecting means at a second timing after the predetermined time from a timing at which the reverse drive voltage is output, and control means for permitting the control voltage generating means to generate and supply the forward drive voltage and the reverse drive voltage having voltage levels corresponding to an output of the current value comparing means to the motor driver, based on the output of the current value comparing means.

According to a further aspect of this invention, there is provided a DC motor brake apparatus for stopping a DC motor running in a forward direction, comprising a motor driver for selectively supplying a forward drive voltage and a reverse drive voltage to a DC motor, control voltage generating means for supplying, in a current detection period, a control voltage to the motor driver to alternately supply the forward drive voltage and the reverse drive voltage to the DC motor, current detecting means for detecting a current from the motor driver proportional to a current flowing through the DC motor, current value comparing means for comparing a first current value of a current attained from the current detecting means at a first timing after a predetermined time from a timing in the current detection period at which the forward drive voltage is output, with a second current value of the current from the current detecting means at a second timing after the predetermined time from a timing in the current detection period at which the reverse drive voltage is output, and control means for permitting the control voltage generating means to generate and supply, in a braking period, the reverse drive voltage to the motor driver, based on the output of the current value comparing means.

BRIEF DESCRIPTION OF THE DRAWINGS

FIG. 3 is a timing chart for explaining the operation of the circuit of FIG. 1;

FIG. 4 is a characteristic diagram showing the relation between the number of rotations of a motor and the drive current thereof;

FIG. 5 is a timing chart for explaining the operation of the second embodiment of the DC motor stop detector according to this invention;

DETAILED DESCRIPTION OF THE PREFERRED EMBODIMENTS

Preferred embodiments of this invention will now be described referring to FIGS. 1 through 11.

Figure 1:
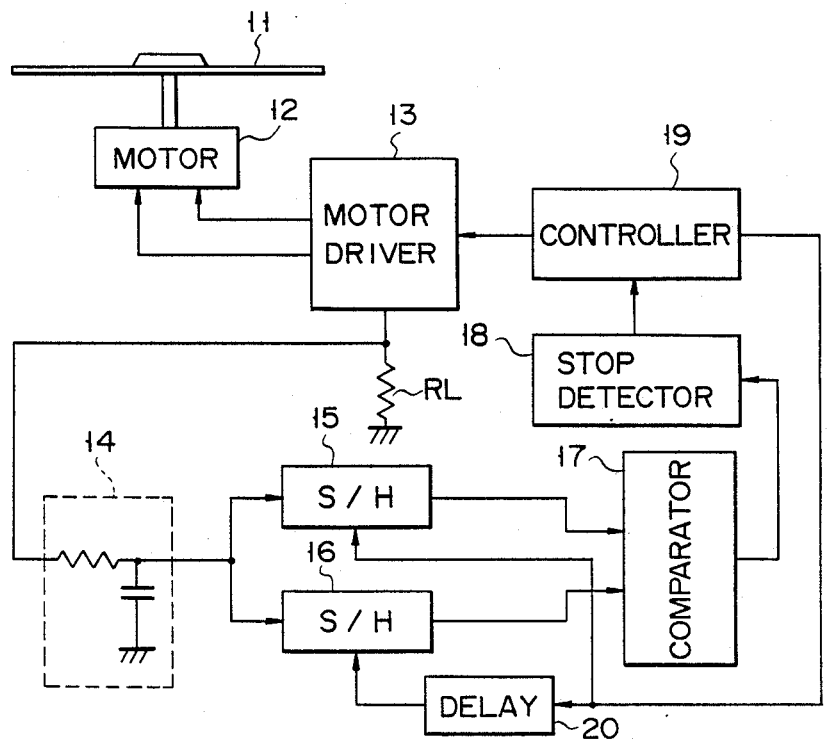
FIG. 1 is a block circuit diagram illustrating the arrangement of the first embodiment of a DC motor stop detector according to this invention.

FIG. 1 illustrates the arrangement of the first embodiment of a DC motor stop detector. A turn table 11 for a CD player, for example, is rotated by a DC motor 12. This DC motor 12 runs in the forward direction by a forward drive voltage supplied from a motor driver 13 and runs in the reverse direction by a reverse drive voltage therefrom, which has the opposite polarity to that of the forward drive voltage. The DC motor 12 also receives, from a motor driver 13, with a brake voltage constituted by a forward drive voltage, a reverse drive voltage, and a stop voltage of a zero potential level.

Figure 2:
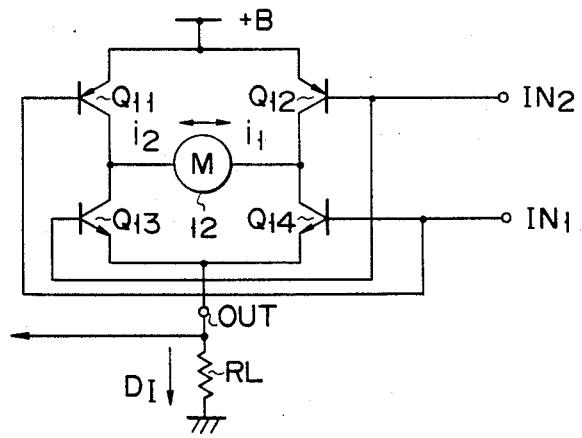
FIG. 2 is a circuit diagram exemplifying the arrangement of a motor driver shown in FIG. 1.

As shown in FIG. 2, the motor driver 13 has PNP transistors $Q_{11}$ and $Q_{12}$ and NPN transistors $Q_{13}$ and $Q_{14}$. An input terminal $IN_1$ is coupled to the bases of the transistors $Q_{11}$ and $Q_{14}$. An input terminal $IN_2$ is coupled to the bases of the transistors $Q_{12}$ and $Q_{13}$. The transistors $Q_{11}$ and $Q_{12}$ have their emitters coupled to a drive power source +B. The transistors $Q_{13}$ and $Q_{14}$ have their emitters coupled to an output terminal OUT. The transistors $Q_{11}$ and $Q_{13}$ have their collectors coupled together, and the transistors $Q_{12}$ and $Q_{14}$ have their collectors coupled together. These collectors are coupled to the DC motor 12. A signal input to the input terminal $IN_2$ is an inverted version of a signal input to the input terminal $IN_1$.

In such motor driver 13, when the input terminal $IN_1$ is at a high level while the input terminal $IN_2$ is at a low level, the transistors $Q_{11}$, $Q_{14}$ are turned ON and the transistors $Q_{12}$, $Q_{13}$ OFF, thus allowing a forward drive current $i_1$ to flow through the DC motor 12. On the other hand, when the input terminal $IN_1$ is at a low level while the input terminal $IN_2$ is at a high level, the transistors $Q_{11}$, $Q_{14}$ are turned OFF and the transistors $Q_{12}$, $Q_{13}$ ON, thus allowing a reverse drive current $i_2$ to flow through the DC motor 12.

An operational current $D_I$ flowing in the above-described motor driver 13 flows across a load resistor RL through the output terminal OUT. A change in operational current $D_I$ flowing across this resistor RL can be monitored by a low-pass filter 14 shown in FIG. 1.

This will be described below more specifically. Referring again to FIG. 1, the drive current of the motor driver 13 is supplied to the low-pass filter 14. The output of the low-pass filter 14 is supplied to first and second sample and hold (S/H) circuits 15 and 16, which execute the following sampling operations. For example, the first S/H circuit 15 performs its sampling operation after a minute period of time in which the brake voltage goes through a polarity inversion from the reverse drive voltage to the forward drive voltage. Then, the second S/H circuit 16 performs its sampling operation after a minute period of time in which the voltage applied is changed from the forward drive voltage to the reverse drive voltage.

FIG. 3 presents a timing chart illustrating the sampling operation in a case where braking is applied while the motor 12 is running in the forward direction. In this diagram, the waveform (a) represents a brake voltage which is a forward drive voltage $V_2$ superimposed on a reverse drive voltage $V_1$. In this case the reverse drive voltage $V_1$ has a duration of approximately 120 μs, and the forward drive voltage $V_2$ a duration of approximately 1 to 2 μs.

The waveform (b) represents the waveform of a motor drive current, when the motor drive current is switched from a reverse drive current to a forward drive current, i.e., when such a voltage as to accelerate the motor 12 in its presently running direction is applied, there will occur an action to reduce the forward drive current. When the forward drive current is switched to the reverse drive current, counter electromotive force of the motor 12 is added to the latter current when the motor 12 is running in the forward direction, so that this current gets greater than the forward drive current. A current change is sampled at times "A" and "B" of the waveform (b), marked by small circles, alternately by the first and second S/H circuits 15 and 16.

Given that the drive voltage is constant, the relation between the motor drive current and the number of rotations of the DC motor 12 would be as illustrated in FIG. 4. In FIG. 4 the inverted portion of the horizontal scale representing the number of rotations shows the circumstance resulting from the forward-running motor 12 being forcibly run in the reverse direction. When the reverse drive voltage, i.e., the drive voltage having the opposite polarity to that of the forward drive voltage, is applied to the motor 12 running in the forward direction, it is considered as a negative number of rotations. From this diagram it is understood that the motor drive current will decrease as the number of forward rotations increases. With the number of motor's rotations being zero, the forward and drive voltages are switched with the same duty at a high speed. This is the case where the forward drive voltage equals the reverse drive voltage or when a stop voltage of a zero potential level is applied. Even in this case, a current is flowing through the motor driver 13.

From FIG. 4 it is understood that with the motor 12 running in the forward direction, when the brake voltage having the waveform (a) of FIG. 3 or the like is supplied to the motor 12, the difference between two sampled current values is larger for a greater number of rotations. This difference becomes smaller as the number of rotations gradually approaches zero. When the number of rotations becomes zero as indicated by "A'" and "B'" in FIG. 3, the two sampled current values become equal to each other.

The outputs of both S/H circuits 15 and 16 performing the sampling operations in the above manner are compared with each other by a comparator 17. When the sampled values become equal to each other as mentioned above, or when the number of rotations of the motor 12 becomes zero, this comparator 17 outputs a coincidence pulse. This pulse is supplied to a stop detector 18 having a counter, for example. Upon detection of this coincidence pulse a predetermined number of times (e.g., 10 times) in a row, this stop detector 18 discriminates that the number of rotations of the motor 12 has become zero. The stop detector 18 may include a timer instead of the counter. In such a case, the stop detector 18 discriminates that the number of rotations of the motor 12 has reached zero when the coincidence pulse is continuously detected for a given period of time.

Since the cycle for detecting this coincidence pulse is very fast, the transition of the motor 12 from the stop state to the reverse running state will not occur even a time corresponding to around 10 cycles has elapsed. When the stop detector 18 discriminates that the number of rotations has become zero, it sends a motor stop detection signal to a controller 19. The controller 19 sets a control voltage being given to the motor driver 13 zero in accordance with the motor stop detection signal, and causes the motor driver 13 to supply a stop voltage as a brake voltage to the motor 12.

The controller 19 prepares and supplies a sampling pulse to the S/H circuits 15 and 16. The sampling pulse is supplied to the S/H circuit 16 through a delay circuit 20. As should be understood from FIG. 3, the output timing for the sampling pulse be preferably immediately before the forward drive voltage $V_2$ is switched to the reverse drive voltage $V_1$. The sampling pulse may be prepared by the brake voltage generated by the motor driver 13 or by other methods as well.

According to the present motor stop detector, any event that the number of rotations of the motor 12 becomes zero can be accurately detected by comparing drive currents at two points immediately after the switching of the polarity of the drive voltage with each other.

The output timing for the sampling pulse to the S/H circuits 15 and 16 may be taken at points "C" and "D," marked by small circles in the waveform (b) in FIG. 5. Even if sampling is done at such timing, two sampled current values become equal to each other when the number of rotations becomes zero as indicated at points "C'" and "D'" in the same diagram. Like in the case of the above-described first embodiment, therefore, it is possible to accurately detect that the number of rotations of the motor 12 becomes zero.

A description will now be given of a DC motor brake apparatus that employs the above DC motor stop detector.

Figure 6:
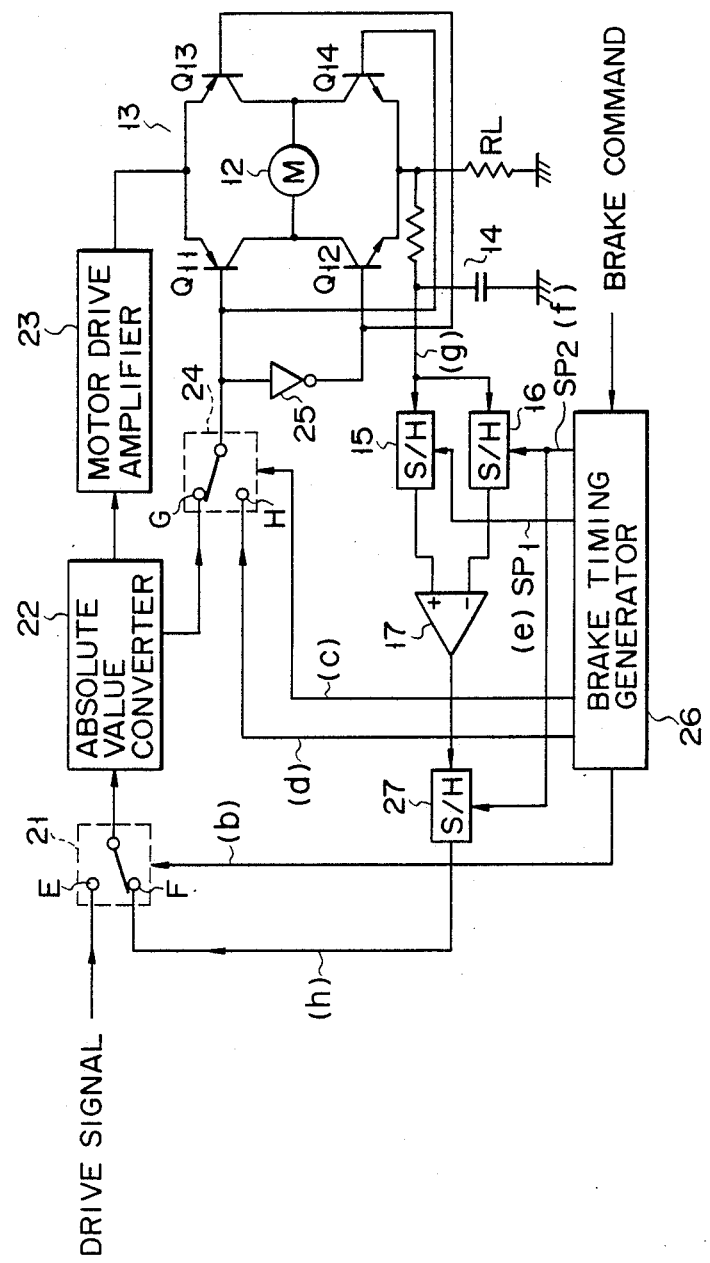
FIG. 6 is a block circuit diagram illustrating the first embodiment of a DC motor brake apparatus according to this invention.

FIG. 6 illustrates the arrangement of the first embodiment of the apparatus. A drive signal (having a positive polarity) to be applied to the DC motor 12 is input to an absolute value converter 22 by setting a first switch 21 to its E terminal. After an absolute value is acquired, it is converted into a drive voltage by a motor drive amplifier 23 and this voltage is then applied to the motor 12 by the aforementioned motor driver 13.

The absolute value converter 22 detects the polarity of an input signal and outputs the signal as it is to the motor drive amplifier 23 if the polarity is positive and outputs the input signal with its polarity inverted if the polarity is negative. At the same time, the absolute value converter 22 outputs a high or low switch select signal in accordance with the detected polarity. This switch select signal is input to the motor driver 13 by setting a second switch 24 to its G terminal. In this case the switch select signal directly input to the first input terminal $IN_1$ shown in FIG. 2 (not shown in FIG. 6) to control the switching the transistors $Q_{11}$ and $Q_{14}$ and is input to the second input terminal $IN_2$ (not shown in FIG. 6; see FIG. 2) through an inverter 25 to control the switching the transistors $Q_{12}$ and $Q_{13}$.

When the drive signal is input to the absolute value converter 22, the detected polarity is positive. Accordingly, the switch select signal is H (high), and the transistors $Q_{11}$, $Q_{14}$ are turned ON while the transistors $Q_{12}$, $Q_{13}$ are turned OFF. This permits a drive current to flow through the motor 12 via the transistors $Q_{11}$, $Q_{14}$. As a result, the motor 12 runs in the forward direction.

The brake apparatus becomes ready for its operation to the DC motor 12 by supplying a brake command to a brake timing generator 26. Upon reception of the brake command, this generator 26 sets the first switch 21 to its F terminal as indicated by the waveform (b) in FIG. 7, and periodically executes alternate selection between H and G terminals of the second switch 24 as indicated by the waveform (c) in the same diagram. In addition, the brake timing generator 26 sends a brake detection signal to the H terminal of the second switch 24. As indicated by the waveform (d) in FIG. 7, this brake detection signal becomes high when the switch 24 is set to the H terminal and becomes low when a predetermined period of time elapses after setting the switch 24 to the H terminal. Furthermore, The brake timing generator 26 outputs a first sample pulse $SP_1$ immediately before the brake detection signal becomes low, as indicated by the waveform (e) in FIG. 7 and outputs a second sample pulse $SP_2$ immediately before the second switch 24 is set to the G terminal, as indicated by the waveform (f).

The first sample pulse SP$_1$ is supplied to the first S/H circuit 15, and the second sample pulse SP$_2$ to the second and third S/H circuits 16 and 27. The first and second S/H circuits 15, 16 hold the output of the low-pass filter 14 at the timings of the input sample pulses SP$_1$ and SP$_2$. As described earlier, the low-pass filter 14 monitors a change in operational current D$_f$ that flows across the load resistor RL. The values held in the S/H circuits 15, 16 are supplied to the comparator 17 which provides the difference between the received values. The output of the comparator 17, at the timing of the aforementioned second sample pulse SP$_2$, is held in the third S/H circuit 27 and is then supplied through the first switch 21 to the absolute value converter 22.

Figure 7:
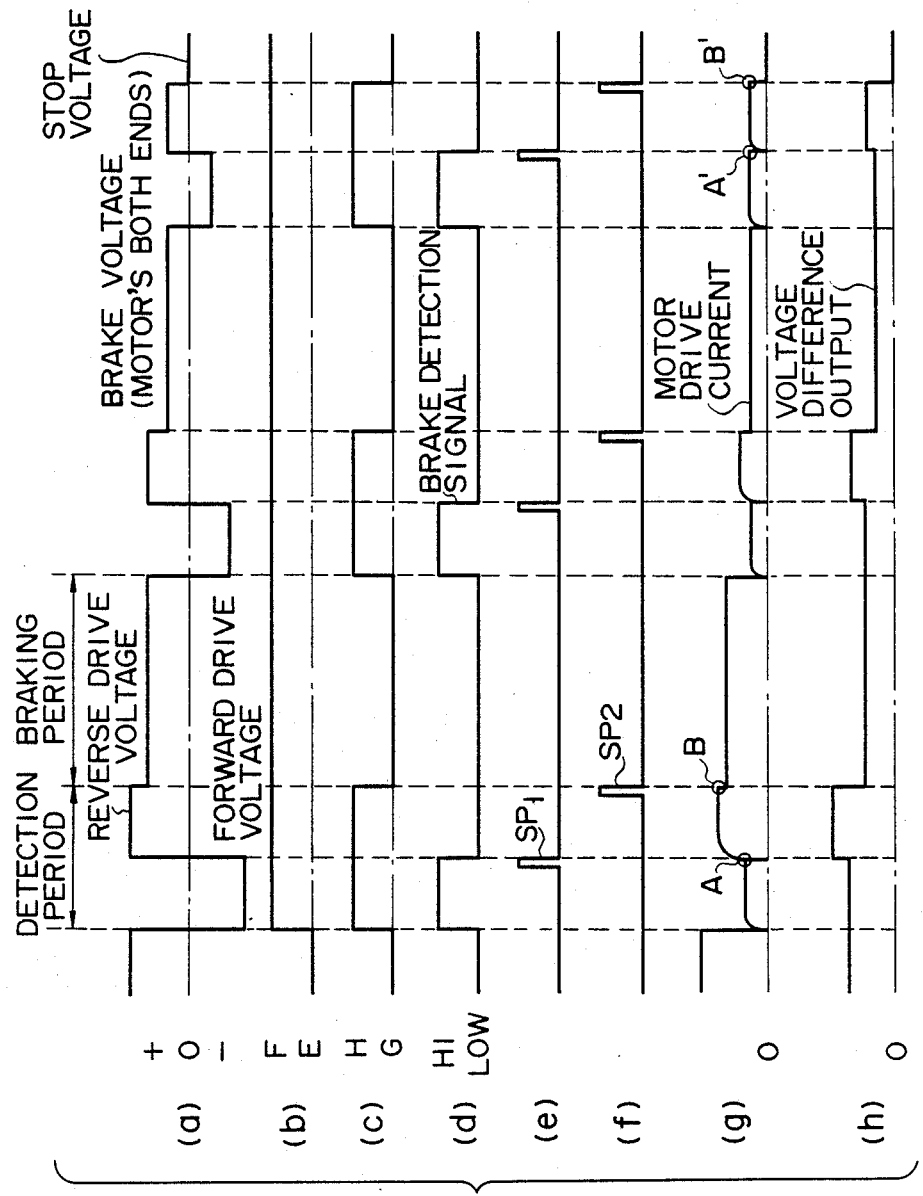
FIG. 7 is a timing chart for explaining the operation of the apparatus shown in FIG. 6.

Since the first switch 21 is set to the F terminal at the time a braking operation is carried out, the motor 12 is driven by the difference voltage held in the third S/H circuit 27 and is enabled to function at the timings shown in FIG. 7, by the output pulse of the brake timing generator 26. This braking operation mainly includes two periods: one is a detection period and the other a braking period. As the basic operation, two types of data, the rotational direction (which can be discriminated by the polarity of the drive voltage) and rotational speed (which can be discriminated by the voltage generated across the load resistor RL), are detected in detection period and used in braking period to drive the motor 12 by a voltage of such a polarity as to apply braking and proper for the rotational speed.

This will be described below step by step. When in detection period, the second switch 24 is coupled to the H terminal and the brake detection signal becomes a high level, the transistors Q$_{12}$, Q$_{13}$ of the motor driver 13 are switched OFF and the transistors Q$_{11}$, Q$_{14}$ are switched ON. Consequently, the motor 12 is applied with the aforementioned forward drive voltage ("negative" voltage as shown by the brake voltage waveform (a) in FIG. 7) and the drive current flows in the forward bias direction. This drive current, irrespective of its bias direction, flows across the load resistor RL only in one direction as indicated by the waveform (g) in FIG. 7.

Then, when the brake detection signal becomes a low level, the transistors Q$_{11}$, Q$_{14}$ of the motor driver 13 are switched OFF and the transistors Q$_{12}$, Q$_{13}$ are switched ON. Consequently, the motor 12 is applied with the aforementioned reverse drive voltage ("positive" voltage as shown by the waveform (a) in FIG. 7) and the drive current flows in the reverse bias direction.

The value of the voltage generated across the load resistor RL are stored in the S/H circuits 15 and 16 before and after the polarity inversion by the first and second sample pulses SP$_1$ and SP$_2$. The difference between both stored voltages is acquired by the comparator 17 whose output representing the voltage difference is then held in the third S/H circuit 27. Since this voltage difference output is proportional to the number of rotations of the motor 12, it will vary as indicated by the waveform (h) in FIG. 7. The voltage difference output is supplied to the motor drive amplifier 23 through the first switch 21 and absolute value converter 22 in braking period.

The voltage difference output has different polarities between the forward and reverse rotations. In braking period, therefore, the applied voltage will be given the consistent polarity in accordance with the rotational direction of the motor 12 by supplying the switch select signal from the absolute value converter 22 to the motor driver 13 through the switch 24. As a result, the brake voltage as indicated by the waveform (a) in FIG. 7 will be applied to the motor 12, and the motor drive current flowing across the load resistor RL will vary as indicated by the waveform (g) in FIG. 7. As should be clear from the same diagram, the brake voltage in braking period decreases as the rotational speed of the motor 12 gets slower, and this voltage becomes zero or a stop voltage when there is no voltage difference output.

In short, the DC motor brake apparatus having the above arrangement inverts the polarity of the drive voltage in detection period, monitors the difference between the drive currents before and after that point in terms of voltage, and drives the motor 12 by the voltage difference output, in the direction where braking is applied to the motor 12. Accordingly, the optimal brake voltage corresponding to the rotational speed can be applied to the motor 12 to surely stop it. In addition, there is no device necessary for detecting the number of rotations of the motor, and such detection can be achieved only by a circuit, thus contributing to compactness of the apparatus.

Figure 8:
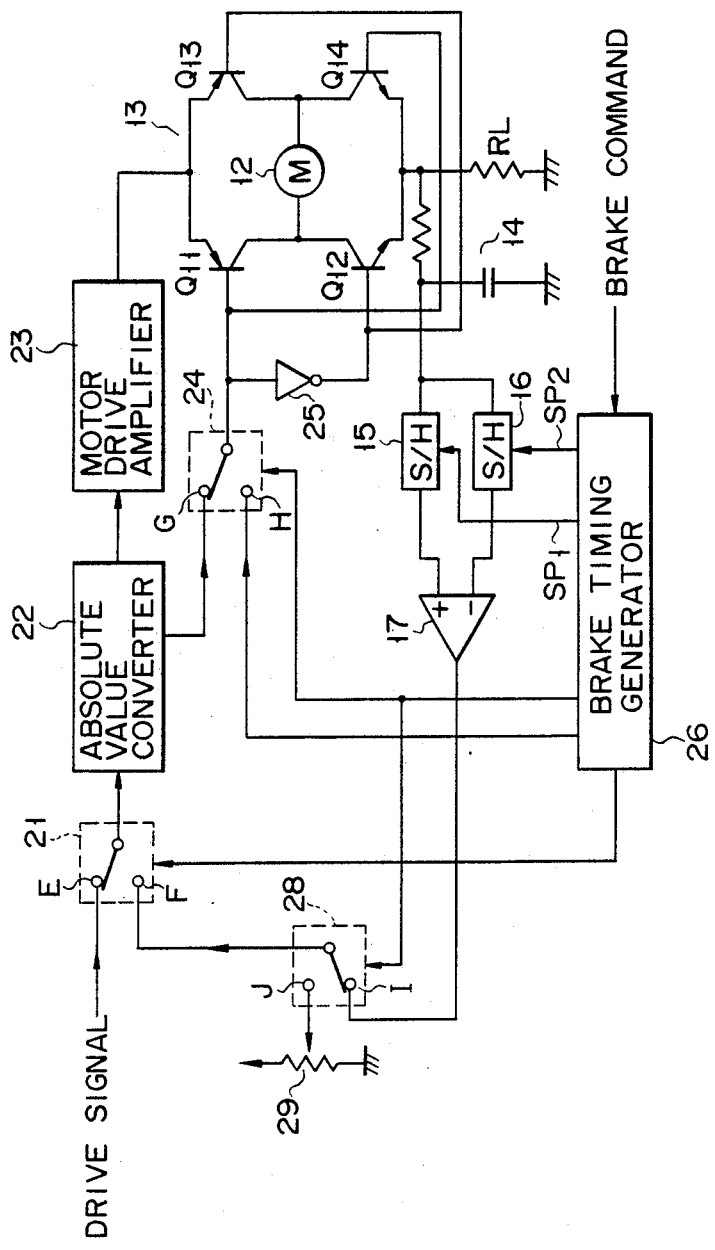
FIG. 8 is a block circuit diagram illustrating the second embodiment of a DC motor brake apparatus according to this invention.

FIG. 8 illustrates the second embodiment of the DC motor brake apparatus according to this invention. In this diagram, the same reference numerals as used in FIG. 6 are used to specify the identical or corresponding components to thereby avoid their otherwise redundant description.

This brake apparatus employs a third switch 28 that interlocks with the second switch 24. When the second switch 24 is set to its G terminal, the third switch 28 is set to the I terminal. As a result, the output of the comparator 17 is led to the absolute value converter 22. When the second switch 24 is set to the H terminal, however, the third switch 28 is set to the J terminal. This leads a reference voltage V$_{ref}$, set by a variable voltage generator 29, into the absolute value converter 22.

According to the first embodiment, the polarity of the brake voltage is directly inverted and the voltages generated across the load resistor RL before and after the inversion are detected in detection period. Both detected values are therefore small and an error in the difference between these detected voltages increases. According to the second embodiment, therefore, a constant voltage $\pm V_{ref}$ is given as the brake voltage in detection period so that a relatively large drive current can flow across the load resistor RL to thereby increase detected voltages. This results in reduction in error in the voltage difference. Even if the brake voltage falls, therefore, the detection sensitivity can be maintained constant and the undesired increase in error in the voltage difference can be prevented.

Figure 9:
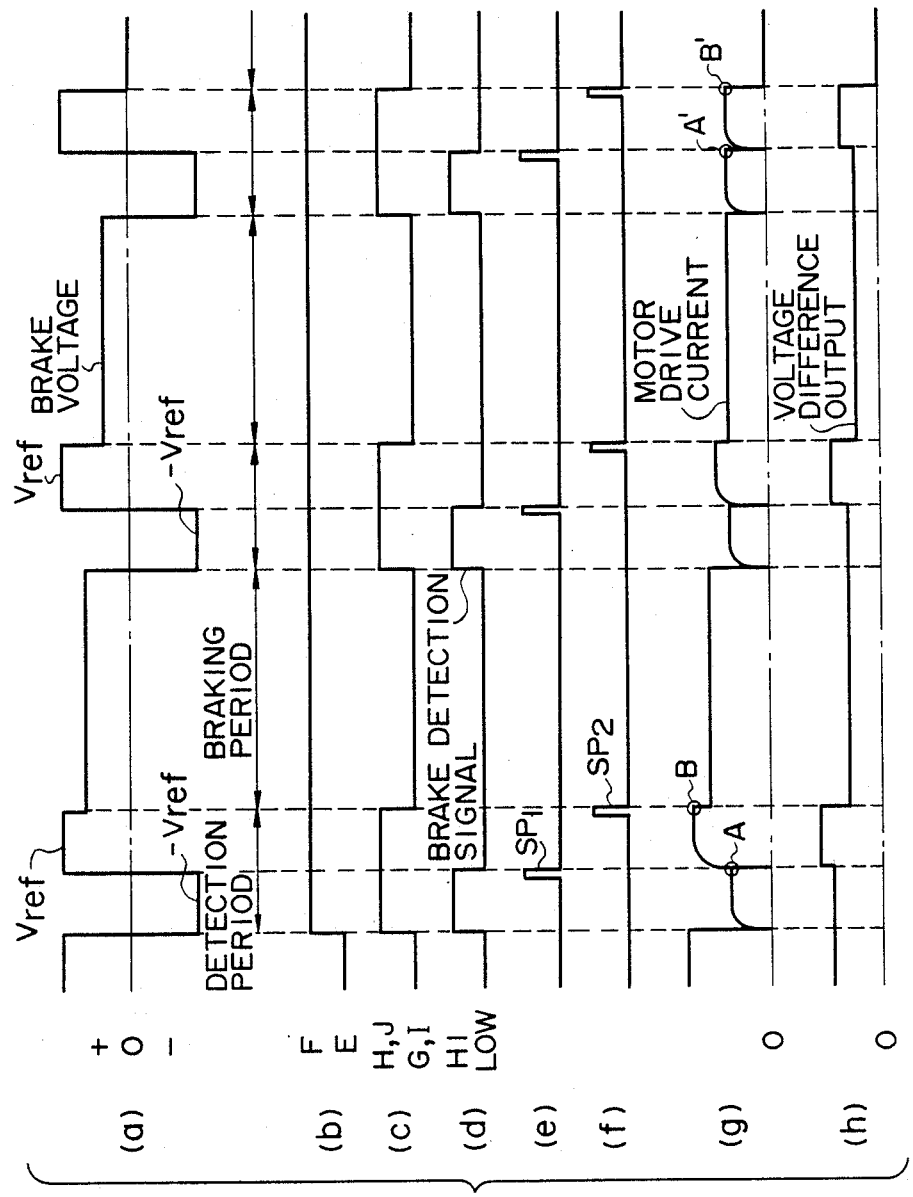
FIG. 9 is a timing chart for explaining the operation of the apparatus shown in FIG. 8.

FIG. 9 illustrates the output timings and waveforms of the individual circuits. The waveform (a) represents the brake voltage, the waveform (b) illustrates the connection statuses of the first switch 21, and the waveform (c) illustrates the connection statuses of the second and third switches 24 and 28. The waveform (d) represents the brake detection signal. The waveform (e) illustrates the timings at which the first sample pulse SP$_1$ is generated, and the waveform (f) the timings at which the second sample pulse SP$_2$ is generated. The waveform (g) indicates the motor drive current, and the waveform (h) the output of the comparator 17 which represents the difference in detected voltages.

It should be understood from this diagram that a brake command input sets the detection period and braking period, and for each detection period, the difference in motor drive currents before and after the polarity inversion gets smaller and the voltage difference output in braking period becomes smaller. Accordingly, the brake voltage will gradually decrease, and the motor 12 will eventually stop when there is no difference in motor drive currents. At this time, since the difference in motor drive currents and the voltage difference output in detection period are relatively large, errors in these values are significantly small as compared with those produced in the first embodiment.

Figure 10:
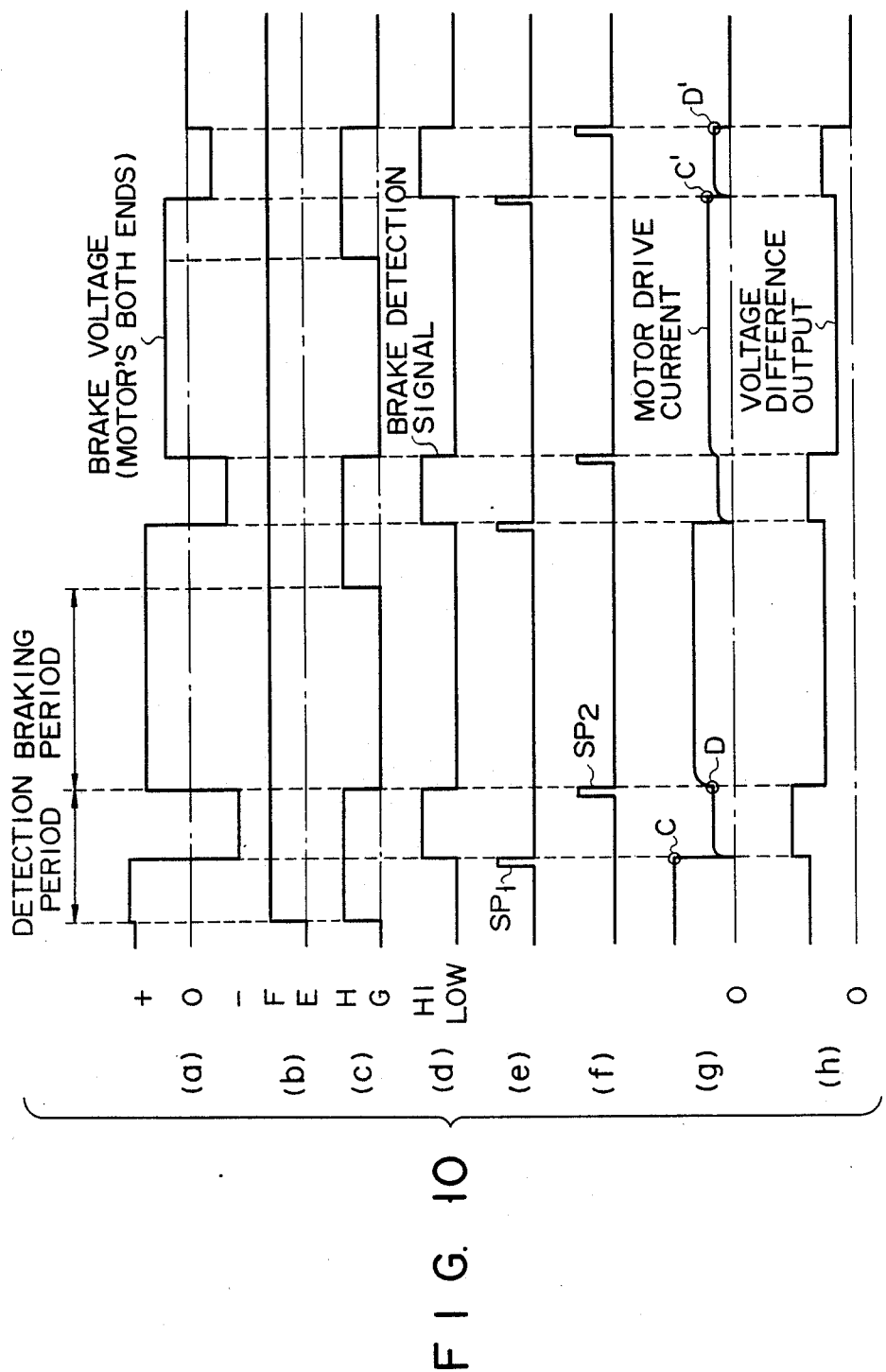
FIG. 10 is a timing chart for explaining the operation of the third embodiment of the DC motor brake apparatus according to this invention.
Figure 11:
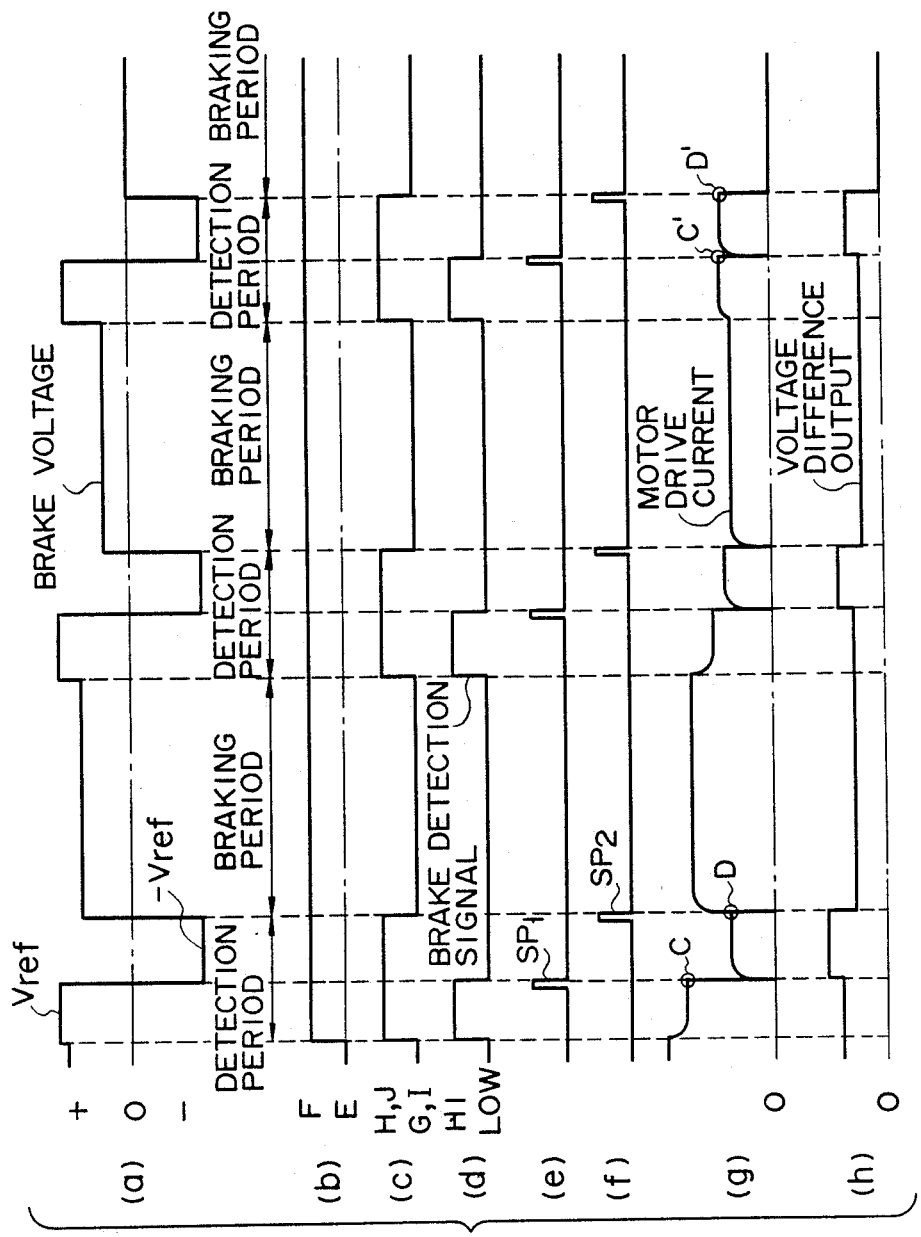
FIG. 11 is a timing chart for explaining the operation of the fourth embodiment of the DC motor brake apparatus according to this invention.

FIGS. 10 and 11 are waveform diagrams for the third and fourth embodiments of the present DC motor brake apparatus, given in association with FIGS. 7 and 9; these apparatuses employ the second embodiment of the present DC motor stop detector, in association with FIGS. 7 and 9. The third and fourth embodiments can produce the same effects as the first and second ones.

As described above, unlike the conventional type, the present DC motor stop detector requires no mechanical means for detecting the motor's rotation, so that it can be realized with a simpler arrangement at a lower cost. Further, even when the speed of the motor becomes slow, the stop state of the motor can be surely detected without taking much time and the zero-rotation state of the motor can be detected with high accuracy. Furthermore, the drive voltage to maximize the braking can be given to the motor most of the time, thus shortening the time required to stop the motor.

The present DC motor brake apparatus, with the use of the above DC motor stop detector, can eliminate the need for a specific device to detect the number of motor's rotations, thus helping make the apparatus itself compact, and can generate the optimal brake voltage with the correct polarity to surely stop the DC motor.

Although the foregoing descriptions of the embodiments have been given with reference to the stop detector and DC motor brake apparatus both for a motor for driving a disk in a CD player or LD player, the types of the applied machines are not restricted to these players. This invention can be applied to a DC motor for use in other various types of machines as well, within the scope and spirit of the invention.

In each of the above embodiments the brake voltage whose level corresponds to the detected voltage difference is applied to the motor. However, it is possible to alter the break voltage application period in accordance with the detected voltage difference while keeping constant the level of the brake voltage.

What is claimed is:

1. A DC motor stop detector for detecting the stopping of a DC motor, comprising:
    a motor driver for selectively supplying a forward drive voltage and a reverse drive voltage to a DC motor;
    control means for supplying a control voltage to said motor driver to control output durations of said forward drive voltage and said reverse drive voltage of said motor driver;
    current detecting means for detecting current from said motor driver proportional to current flowing through said DC motor; and
    current value comparing means for comparing a first current value of current attained from said current detecting means at a first timing after a predetermined time from a timing at which said forward drive voltage is output, with a second current value of said current from said current detecting means at a second timing after said predetermined time from a timing at which said reverse drive voltage is output, said DC motor not running when said first current value equals said second current value.

2. The DC motor stop detector according to claim 1, further comprising stop detecting means for outputting a stop detection signal indicating that said DC motor has stopped running when the output of said current value comparing means shows, by a predetermined number of times in a row, that said first current value equals said second current value.

3. The DC motor stop detector according to claim 1, wherein said predetermined time corresponds to a period from a timing at which said forward drive voltage is output to a timing immediately before said forward drive voltage is switched to said reverse drive voltage.

4. The DC motor stop detector according to claim 1, wherein said predetermined time is zero.

5. The DC motor stop detector according to claim 1, wherein said current value comparing means includes:
    a first sample and hold circuit for sampling and holding the value of current attained from said current detecting means at said first timing;
    a second sample and hold circuit for sampling and holding the value of current attained from said current detecting means at said second timing; and
    a comparator for comparing said current values held in said first and second sample and hold circuits with each other.

6. A DC motor brake apparatus for stopping a DC motor running in a forward direction, comprising
    a motor driver for selectively supplying a forward drive voltage and a reverse drive voltage to a DC motor;
    control voltage generating means for supplying a control voltage to said motor driver to control output durations and voltage levels of said forward drive voltage and said reverse drive voltage of said motor driver;
    current detecting means for detecting current from said motor driver proportional to current flowing through said DC motor;
    current value comparing means for comparing a first current value of current attained from said current detecting means at a first timing after a predetermined time from a timing at which said forward drive voltage is output, with a second current value of said current from said current detecting means at a second timing after said predetermined time from a timing at which said reverse drive voltage is output; and
    control means for permitting said control voltage generating means to generate and supply said forward drive voltage and said reverse drive voltage having voltage levels corresponding to an output of said current value comparing means to said motor driver, based on said output of said current value comparing means.

7. The apparatus according to claim 6, wherein said predetermined time corresponds to a period from a timing at which said forward drive voltage is output to a timing immediately before said forward drive voltage is switched to said reverse drive voltage.

8. The apparatus according to claim 6, wherein said predetermined time is zero.

9. The apparatus according to claim 6, wherein said current value comparing means includes:

a first sample and hold circuit for sampling and holding the value of current attained from said current detecting means at said first timing;

a second sample and hold circuit for sampling and holding the value of current attained from said current detecting means at said second timing; and a comparator for comparing said current values held in said first and second sample and hold circuits with each other.

10. The apparatus according to claim 9, further comprising:

first timing signal generating means for generating and supplying a first sampling pulse to said first sample and hold circuit at said first timing for execution of a sampling operation of said first sample and hold circuit;

second timing signal generating means for generating and supplying a second sampling pulse to said second sample and hold circuit at said second timing for execution of a sampling operation of said second sample and hold circuit; and third timing signal generating means for generating and supplying a switching timing signal indicating a generation timing for said forward and reverse drive voltages, to said control voltage generating means to thereby generate said control voltage for controlling said output durations of said forward and reverse drive voltages of said motor driver.

11. A DC motor brake apparatus for stopping a DC motor running in a forward direction, comprising:

a motor driver for selectively supplying a forward drive voltage and a reverse drive voltage to a DC motor;

control voltage generating means for supplying, in a current detection period, a control voltage to said motor driver to alternately supply said forward drive voltage and said reverse drive voltage to said DC motor;

current detecting means for detecting current from said motor driver proportional to current flowing through said DC motor;

current value comparing means for comparing a first current value of current attained from said current detecting means at a first timing after a predetermined time from a timing in said current detection period at which said forward drive voltage is output, with a second current value of said current from said current detecting means at a second timing after said predetermined time from a timing in said current detection period at which said reverse drive voltage is output; and control means for permitting said control voltage generating means to generate and supply, in a braking period, said reverse drive voltage to said motor driver, based on said output of said current value comparing means.

12. The apparatus according to claim 11, wherein said control voltage generating means includes means for generating, in said current detection period, said control voltage to permit said motor driver to alternately supply said forward drive voltage and a voltage, serving as said reverse drive voltage, having the same level with an opposite polarity as said forward drive voltage, to said DC motor.

13. The apparatus according to claim 11, wherein said predetermined time corresponds to a period from a timing at which said forward drive voltage is output to a timing immediately before said forward drive voltage is switched to said reverse drive voltage.

14. The apparatus according to claim 11, wherein said predetermined time is zero.

15. The apparatus according to claim 11, wherein said current value comparing means includes:

a first sample and hold circuit for sampling and holding the value of current attained from said current detecting means at said first timing;

a second sample and hold circuit for sampling and holding the value of current attained from said current detecting means at said second timing; and a comparator for comparing said current values held in said first and second sample and hold circuits with each other.

16. The apparatus according to claim 15, further comprising:

first timing signal generating means for generating and supplying a first sampling pulse to said first sample and hold circuit at said first timing for execution of a sampling operation of said first sample and hold circuit;

second timing signal generating means for generating and supplying a second sampling pulse to said second sample and hold circuit at said second timing for execution of a sampling operation of said second sample and hold circuit; and third timing signal generating means for generating and supplying a switching timing signal indicating a generation timing for said forward and reverse drive voltages, to said control voltage generating means to thereby generate said control voltage for controlling the output durations of said forward and reverse drive voltages of said motor driver.

17. The apparatus according to claim 11, wherein said control means permits said control voltage generating means to generate and supply, in said breaking period, said reverse drive voltage having a voltage level corresponding to an output of said current value comparing means.

* * * * *